(12) United States Patent
Caldwell et al.

(10) Patent No.: US 8,175,433 B2
(45) Date of Patent: May 8, 2012

(54) FIBER OPTIC CABLES COUPLING AND METHODS THEREFOR

(75) Inventors: William Eric Caldwell, Taylorsville, NC (US); Kenneth D. Temple, Jr., Newton, NC (US); Richard S. Wagman, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 126 days.

(21) Appl. No.: 12/498,509

(22) Filed: Jul. 7, 2009

(65) Prior Publication Data

US 2009/0274425 A1    Nov. 5, 2009

Related U.S. Application Data

(63) Continuation of application No. 11/888,182, filed on Jul. 31, 2007, now abandoned.

(51) Int. Cl.
*G02B 6/44* (2006.01)

(52) U.S. Cl. ........ 385/100; 385/102; 385/106; 385/115; 264/1.29

(58) Field of Classification Search ........... 385/100–121
See application file for complete search history.

(56) References Cited

U.S. PATENT DOCUMENTS

| | | | |
|---|---|---|---|
| 3,166,395 A | 1/1965 | Hicks, Jr. | 65/402 |
| 4,716,260 A | 12/1987 | Hoffman et al. | 174/102 R |
| 4,729,619 A | 3/1988 | Blomgren | 350/96.21 |
| 4,824,203 A | 4/1989 | Kunze et al. | 350/96.21 |
| 5,189,719 A | 2/1993 | Coleman et al. | 385/101 |
| 5,390,270 A | 2/1995 | Hanzawa et al. | 385/81 |
| 5,592,577 A | 1/1997 | Tanoue | 385/12 |
| 6,314,224 B1* | 11/2001 | Stevens et al. | 385/113 |
| 7,277,615 B2* | 10/2007 | Greenwood et al. | 385/100 |
| 7,295,734 B2 | 11/2007 | Bayindir et al. | 385/101 |
| 7,529,451 B2* | 5/2009 | Caldwell et al. | 385/107 |
| 2003/0081909 A1 | 5/2003 | Taira | 385/78 |
| 2003/0165311 A1 | 9/2003 | Wagman et al. | 385/113 |
| 2006/0165355 A1 | 7/2006 | Greenwood et al. | 385/100 |
| 2006/0193573 A1 | 8/2006 | Greenwood et al. | 385/103 |
| 2007/0098339 A1 | 5/2007 | Bringuier et al. | 385/106 |
| 2007/0140640 A1 | 6/2007 | Temple, Jr. et al. | 385/134 |
| 2008/0056650 A1 | 3/2008 | Stingl et al. | 385/100 |
| 2009/0034919 A1 | 2/2009 | Caldwell et al. | 385/107 |

* cited by examiner

*Primary Examiner* — Ellen Kim
(74) *Attorney, Agent, or Firm* — Russell S. Magaziner

(57) ABSTRACT

A fiber optic cable including at least one optical fiber disposed within a cavity of a cable jacket and methods for manufacturing the same are disclosed. The cavity has a first cavity cross-sectional area and a second cavity cross-sectional area located at different longitudinal locations along the cable, where the first cavity cross-sectional area is greater than the second cavity cross-sectional area. The region of the second cavity cross-sectional area of the cable provides and/or increases the coupling level of the at least one optical fiber to the cable jacket. In further embodiments, the fiber optic cable is a dry cable having one or more dry insert within the cavity for cushioning and/or optionally providing water-blocking for the cable.

33 Claims, 8 Drawing Sheets

FIBER OPTIC CABLES COUPLING AND METHODS THEREFOR

RELATED APPLICATIONS

This application is a continuation of application Ser. No. 11/888,182, filed Jul. 31, 2007, now abandoned the disclosure of which is incorporated herein by reference in its entirety.

TECHNICAL FIELD

The present invention relates generally to fiber optic cables and assemblies that are useful for routing optical fibers toward the subscriber and/or other suitable cables/assemblies in an optical network. Specifically, the fiber optic cables and assemblies of the present invention have one or more features for providing and/or tailoring the level of coupling for the optical fibers, optical fiber ribbons, or the like.

BACKGROUND

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical waveguide cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the optical fiber long-haul links.

Fiber optic cables used for distribution or drop links should have the necessary characteristics for the application. For instance, the fiber optic cable designs should provide water-blocking, cushion the optical fibers, couple the optical fibers to the buffer tube or cable jacket, and allow movement of the optical fibers during bending, installation, or the like However, not all fiber optic cable designs provided all of these characteristics and instead rely on installation procedures to achieve the desired characteristics.

For instance, some fiber optic cable designs can require special installation procedures such as coiling the cable at specified intervals for providing coupling to the optical fibers. Using installation procedures to achieve the desired characteristics can be problematic and/or add complexity and expense. By way of example, the fiber optic cable can be installed improperly and fail to provide the proper level of coupling. Additionally, the coiling of the cable requires extra cable length within the optical network. If the fiber optic cable is used as a distribution cable, coiling of the cable can interfere with intended node locations (e.g., distribution locations) along the length of the cable.

Thus, there has been a long-felt need for fiber optic cable designs that provide all of the required performance characteristics along with quick and easy access and deployment without requiring special installation techniques. Moreover, the reliability and robustness of the fiber optic cables and the interconnection therebetween must withstand the rigors of an outdoor environment.

SUMMARY

To achieve these and other advantages and in accordance with the purpose of the invention as embodied and broadly described herein, the invention is directed to fiber optic cables that have one or more features for providing and/or tailoring the level of coupling for the optical fibers, optical fiber ribbons, or the like and methods for making the same.

One aspect the invention is directed to a fiber optic cable having at least one optical fiber disposed within a cavity of a cable jacket that changes cross-sectional area along its longitudinal length for providing and/or tailoring coupling. Specifically, the cavity has a first cavity cross-sectional area and a second cavity cross-sectional area located at different longitudinal locations along the cable, wherein the first cavity cross-sectional area is greater than the second cavity cross-sectional area. By way of example, the cavity has a cavity cross-sectional ratio defined as the second cavity cross-sectional area divided by the first cavity cross-sectional area, where the cavity cross-sectional ratio is between about 50% and about 90%. In advantageous embodiments, the fiber optic cables are dry cable designs that eliminate the thixotropic grease/gel from the cable. Additionally, the present invention is directed to methods for making fiber optic cables where the cross-sectional area of the cavity changes along it longitudinal length.

Another aspect the invention is directed to a fiber optic cable having at least one optical fiber and a dry insert disposed within a cavity of a cable jacket where the dry insert changes thickness along its longitudinal length for providing and/or tailoring coupling. Specifically, the dry insert has a first thickness at a first longitudinal location and a second thickness at a second longitudinal location where the first thickness is greater for the second thickness, thereby creating a thickness variation along the longitudinal length of the at least one dry insert. By way of example, the dry insert has a dry insert thickness ratio defined as the second thickness divided by the first thickness, where the dry insert thickness ratio is between about 50% and about 90%. Additionally, the present invention is directed to methods for making fiber optic cables where the dry insert changes thickness along it longitudinal length.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

DETAILED DESCRIPTION OF EXEMPLARY EMBODIMENTS

Figure 1:
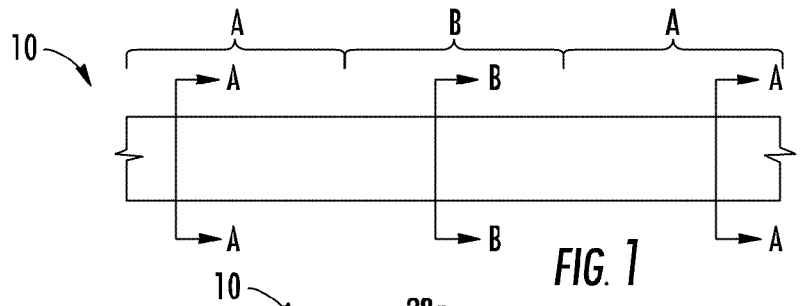
FIG. 1 is a plan view showing the location of cross-sectional planes of an explanatory fiber optic cable according to the present invention.

Reference will now be made in detail to exemplary embodiments of the invention, examples of which are described herein and shown in the accompanying drawings. Whenever practical, the same reference numerals are used throughout the drawings to refer to the same or similar parts or features. FIG. 1 depicts an explanatory fiber optic cable 10 (hereinafter cable 10) according to the present invention that can be configured for use as a drop cable, a distribution cable, or other suitable portions of an optical network. Generally speaking, a distribution cable will have a relatively high optical fiber count such twelve or more optical fibers for further distribution to the optical network. On the other hand, a drop cable will have a relatively low optical count such as up to four optical fibers for routing towards a subscriber or a business, but drop cables may include higher fiber counts. As depicted, the portion of cable 10 shown includes an A-region disposed between a first B-region and a second B-region along its longitudinal length as noted by the brackets. Cables of the invention can have A-regions and B-regions that provide different levels of coupling of the optical fiber to the cable jacket or tube, thereby advantageously allowing tailoring of the coupling level for the optical fiber(s). Specifically, the cable design tailors the desired level of coupling by using a cross-sectional restriction of a cavity for the cable jacket/tube and/or using a cable component such as a dry insert with a thickened portion. Moreover, the concepts of the invention may also be advantageous since the B-region also provides a necked down area and/or cable component filled area where inhibiting the migration of water along the cable is easier. Explanatory cross-sectional views of the different regions of explanatory cable 10 are taken at cross-sectional planes A-A and B-B as shown by FIG. 1 and represent the respective A-region and B-region for each cable.

Figure 2A:
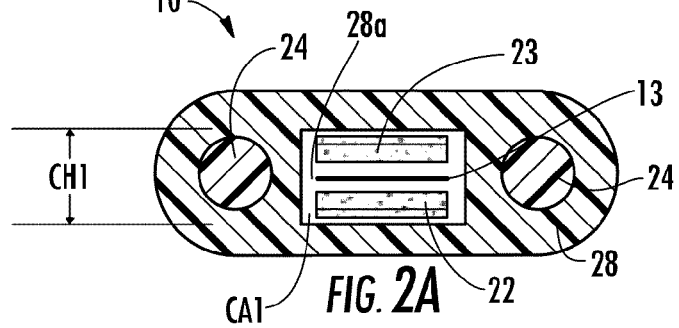
FIGS. 2A and 2B depict respective cross-sectional views at the cross-sectional planes of FIG. 1 for an explanatory dry fiber optic cable.
Figure 2B:
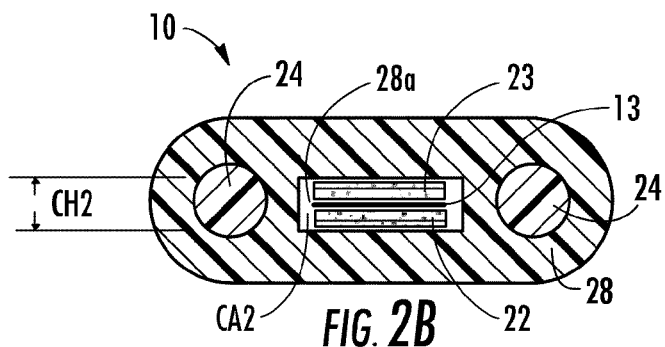

FIGS. 2a and 2b depict respective cable cross-sections for an explanatory dry cable 10 respectively taken along cross-sectional planes A-A and B-B of FIG. 1. As shown, cable 10 includes at least one optical fiber (not visible) that is a portion of an optical fiber ribbon 13 (represented by the horizontal line), a first dry insert 22, a second dry insert 23, at least one strength member 24, and a cable jacket 28 having a cavity 28a. Generally speaking, cable 10 shown in FIGS. 2a and 2b has a generally flat profile, but other cable designs can have other profiles such as round or the like. In other words, cable jacket 28 has two major surfaces (not numbered) that are generally flat and are connected by arcuate end surfaces (not numbered) as shown, thereby resulting in a cable having a relatively small cross-sectional footprint. Generally speaking, cavity 28a of cable jacket 28 has a generally rectangular shape for carrying one or more fiber optic ribbons in a non-stranded configuration. Simply stated, optical fiber ribbon 13 is disposed between first dry insert 22 and second dry insert 23 that have a compressible layer, thereby providing cushioning, coupling, and optionally water-blocking. As shown, this cable also has strength members 24,24 disposed on opposing sides of cavity 20, thereby imparting a preferential bend characteristic to the cable that is generally aligned with the preferential bend characteristic of the ribbon. By way of example, strength members 24,24 are preferably a dielectric material such as glass-reinforced plastic (GRP) having a diameter such as about 2.3 millimeters, thereby allowing an all dielectric cable design; however, other strength member material, sizes, and/or shapes are possible. For instance, strength members can use a conductive material such as steel, copper-clad steel, or the like and/or they may have shapes other than round such as the oval.

Cavity 28a is sized for allowing ribbons or optical fibers the adequate freedom to move when, for instance, the cable is bent while maintaining adequate optical attenuation performance and the B-region has one or more features that allows the tailoring of the coupling level of optical fibers to cable jacket 28. More specifically, cavity 28a has a first cavity cross-sectional area (CA1) depicted in FIG. 2A and a second cavity cross-sectional area (CA2) depicted in FIG. 2B, where the first cavity cross-sectional area (CA1) is greater than the second cavity cross-sectional area (CA2). As shown, the change in cavity cross-sectional areas is generally attributable to a change between a first cavity height CH1 and a second cavity height CH2 since the cavity width (not numbered) remains similar. As represented by FIG. 2B, second cavity cross-sectional area (CA2) is asymmetrical about the neutral bending axis of the cable, but other configurations could have generally symmetrical second cavity cross-sectional area about the neutral bending axis. The orientation of the second cavity cross-sectional area may depend on the method for creating the B-region as discussed herein. By way of example, cavity 28a can have a cavity cross-sectional ratio defined as the second cavity cross-sectional area (CA2) divided by the first cavity cross-sectional area (CA1) with the cavity cross-sectional ratio (CA2/CA1) being between about 50% and 90%. By way of a numerical illustration, a nominal cavity height for the A-region is 5.5 millimeters and a nominal cavity height for the B-region is about 3.7 millimeters (with the same cavity width), thereby yielding a cavity cross-sectional ratio of about 67%.

Simply stated, the B-region allows tailoring of the coupling by providing and/or increasing the compression of the dry inserts 22,23 (i.e., the B-region may provide all of the coupling or a substantial fraction thereof). Compression of dry insert(s) is actually a localized maximum compression of the dry insert(s) that occurs where the ribbons undulate into the same due to the excess ribbon length (ERL) of the optical fiber ribbon 13 (i.e., the ribbons are longer than the cavity for the length of the cable). In other words, the compression of the dry inserts creates a normal force on the ribbon(s), thereby helping maintain the longitudinal position of the optical fibers/ribbons during normal cable operating conditions. Further, cable 10 can have a plurality of B-regions disposed along its longitudinal length with predetermined spacing and/or lengths (i.e., intermittently disposed along the length of the cable) for the B-region to tailor to a desired level of coupling. For instance, the cable can have a plurality of B-regions having a longitudinal length of between about 1-10 centimeters disposed between A-regions having a longitudinal length of between about 300-10,000 centimeters, but other suitable region lengths and/or patterns are possible. Using a relatively short length for the B-region tends to force a node at that location for the undulating optical fibers, while still allowing the optical fibers the necessary freedom to move.

Optical fiber ribbons 13 used in the cables of the present invention can have any suitable design or ribbon count as known in the art or developed hereafter. For instance, optical fiber ribbons 13 can have any suitable subunit construction, a common matrix construction, geometry, stress concentrators, different fiber counts, and/or the like. Subunits allow predetermined splitting of the optical fiber ribbons into predictable smaller fiber count units, preferably without the use of special tools. By way of example, fiber optic ribbon 13 is a twenty-four fiber ribbon having two twelve-fiber units each having three subunits with four optical fibers. Of course, other suitable twenty-four fiber ribbon configurations are possible such as two twelve fiber units, three eight fiber units, four six fiber units, or six four fiber units depending on the requirements of the network architecture.

Optical fibers preferably have an excess fiber length (EFL) compared with a length of cavity 28a; however, in some instances the EFL may also be slightly negative. Likewise, ribbons can have an excess ribbon length (ERL) with respect to the length of the cavity. Besides inhibiting the application of strain to the optical fibers, EFL or ERL can aid in coupling the optical fibers or ribbons with the cable jacket or tube. By way of example, the ERL is preferably in the range of about 0.1 percent to about 1.2 percent, and more preferably in the range of about 0.3 percent to about 1.0 percent, and most preferably in the range of about 0.5 percent to about 0.8 percent, thereby inhibiting the application of strain, allowing bending of the fiber optic cable without causing elevated levels of optical attenuation, and/or suitable low temperature performance. Additionally, the amount of ERL may depend on specific cable design such as the number of ribbons within the cavity, the cavity size, cavity shape, intended application, and/or other parameters.

As depicted in FIG. 2B, coupling for optical fiber ribbon 13 is provided in the B-region by the compression of dry inserts 22,23 on optical fiber ribbon 13 due to the smaller cavity height CH2. No matter the construction and/or materials of the dry insert(s) or the like, the cable design should provide the desired level of coupling for the optical fibers to the cable jacket or tube. Additionally, in order to quantify the level of coupling for the optical fibers a relatively long length of cable is required. By way of example, optical fibers of cables according to the present invention have a coupling force of at least about 0.1625 Newtons per optical fiber for a thirty-meter length of fiber optic cable. Illustratively, a fiber optic cable having a single ribbon with twelve optical fibers in the ribbon should have a minimum coupling force of about 1.95 Newtons for a thirty-meter length of fiber optic cable. Likewise, a similar fiber optical cable having a single optical fiber ribbon with six optical fibers should have a minimum coupling force of about 0.975 Newtons for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the EFL (or ERL) must be straightened so that the coupling force is the amount of force required to move the entire length of optical fibers within the thirty-meter fiber optic cable sample.

Dry inserts can be any suitable material, materials and/or structure such as one or more elongate tapes such as a foam tape disposed within the cavity for coupling the ribbons with the cable jacket or tube. Optionally, dry inserts can also include a water-blocking characteristic for blocking the migration of water along the cable. As depicted in FIGS. 2A and 2B, dry inserts 22,23 are disposed on both the top and bottom of ribbon 13. In other words, the components form a elongate tape/ribbon sandwich with the first elongate tape disposed on a first planar side of the ribbon (or ribbon stack) and the second elongate tape being disposed on a the second major side of the ribbon (or ribbon stack) within the generally rectangular cavity. Stated another way, planar surface(s) of the ribbon generally faces the planar surface of the dry inserts and the planar surface of the same is also generally aligned with the major dimension of the cavity so that all of the major planar surfaces of the components are generally aligned within the generally rectangular cavity as depicted. Of course, other embodiments may have one or more dry inserts wrapped about the optical fibers or disposed on one or more sides thereof. In this cable, dry inserts 22,23 of FIG. 2A are elongate tapes formed from an open cell foam such as a polyurethane material; however, other suitable foam materials for coupling and cushioning of the ribbons are possible such as polyethylene, polypropylene, EVA.

Additionally, one or more dry inserts can include an optional water-swellable layer (represented by the solid hatching of the dry insert and not numbered) for inhibiting the migration of water within the cable. For instance, a foam layer and a water-swellable layer are laminated together, thereby forming a composite elongate tape (i.e., a water-swellable foam tape). In other embodiments, the compressible layer and the optional water-swellable layer are discrete individual components that are unattached (i.e., a separate compressible layer and water-swellable component such as being a water-swellable yarn or thread). Generally speaking, dry inserts used herein are multi-functional. For instance, besides aiding the coupling the optical fibers, ribbons, modules, or the like to the cable jacket, they may optionally inhibit the migration of water, as well as cushion the optical fibers during bending of the cable. Although the dry inserts are shown having a width smaller than the cavity, the dry inserts may have a width that is greater than the cavity. Additionally, dry inserts can have other constructions besides an elongate foam tape and the optional water-swellable layer can have any suitable material(s)/construction(s).

Figure 3A:
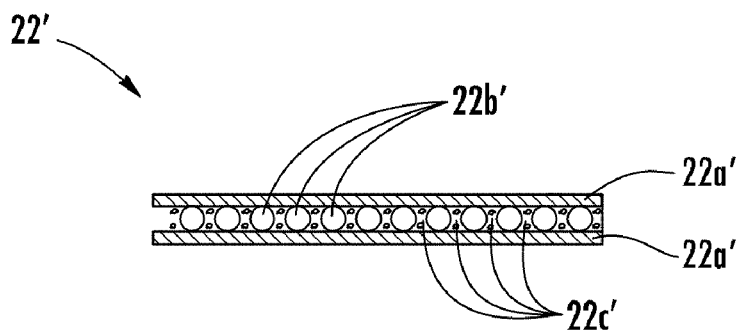
FIGS. 3A-3D depict respective cross-sectional views of explanatory dry inserts for use with the concepts of the present invention.

Illustratively, FIG. 3a depicts one example of another dry insert 22'. Dry insert 22' includes a compressible layer formed from a plurality of microspheres 22b' disposed between a top tape 22a' and bottom tape 22a'. As with other tapes used for the dry insert, tapes 22a' can be formed from any suitable material such as a non-woven material, a polyester film like Mylar, or other like materials. More specifically, microspheres 22b' are generally disposed between tapes 22a' and are attached using a suitable method such as an adhesive, binding agent, application of heat and/or pressure, or the like. Additionally, an optional water-swellable substance such as a plurality of water-swellable particles, a plurality of water-swellable fiber, or a water-swellable coating 22c' may also be disposed between tapes 22a' with microspheres 22b' or on a portion one or more tapes 22a'. Suitable materials for microspheres 22b' are relatively soft so they are compressible and sized so that they will not cause undue levels of optical attenuation if they press against the optical fiber or ribbon. By way of example, suitable hollow microspheres are available from Akzo Nobel of the Netherlands under the tradename EXPANCEL and includes copolymers of monomers vinylidene chloride, acrylonitrile, and methylmethacrylate. Other plastic hollow microspheres are available from Asia Pacific Microspheres of Malaysia under the tradename of PHENOSET, which are phenolic and amino-based micro spheres.

The compressible nature of hollow polymeric microspheres is suited for providing adequate coupling of the optical fibers to the tube or cable jacket. Additionally, the smooth round surface of these microspheres permits pressing against the optical fibers without inducing elevated levels of optical attenuation such as during bending, twisting, or crushing of the cable. Additionally, the size of the hollow microspheres can vary from about 1 micron to about 300 microns, likewise, a wall thickness of the microspheres can also vary from about 0.1 micron up to several microns, but other suitable dimensions are possible as long as a suitable level of optical performance is maintained.

Figure 3B:
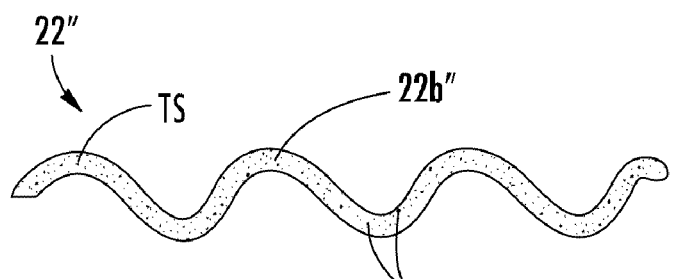

FIG. 3b depicts another example of a dry insert 22" that provides a compressible layer 22b" using the geometry of its shape. More specifically, compressible layer 22b" is provided by using a dimensional fabric that has a generally textured shape in one or more directions for providing the compressible layer. As shown, dry insert 22" has a generally textured shape TS and is formed from a suitably soft and flexible material so that it can deform for providing an adequate level of coupling for the optical fibers or ribbons without causing undue levels of optical attenuation. By way of example, suitable fabrics are available from Freudenberg of Durham, N.C. under the name of Novolon. The dimensional fabrics may be formed from a variety of materials such as polyester, polypropylene, nylon, or other suitable materials. Generally speaking, dimensional fabrics are formed using a molding process for transforming a two-dimensional (i.e., flat) fabric or substrate into a three-dimensional (i.e., textured shape) fabric or substrate with the desired textured shape TS. The coupling and/or compressibility of dry insert 22" can be tailored by changing parameters such as the number of contact points per surface area (i.e., changing the density of high and low contact points), the height from a high point to a low point, the dimension fabric profile, and/or flexibility of the dimensional fabric. Again, dry insert 22" can include an optional water-swellable layer for blocking the migration of water along the cable or tube assembly. For instance, the water-swellable layer may be a coating applied to one or more surfaces or applied to the fibers of the dimensional fabric, include water-swellable particles disposed in or on the dry insert, and/or may include superabsorbent fibers. Suitable water-swellable filaments are, for example, LANSEAL materials available from Toyobo of Osaka, Japan or OASIS materials available from Technical Absorbents Ltd. of South Humberside, United Kingdom.

Figure 3C:
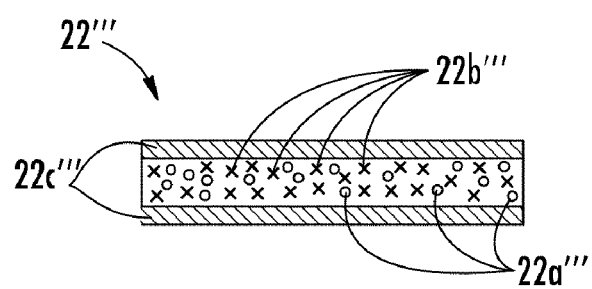

FIG. 3c depicts a further embodiment of a dry insert 22''' having a compressible layer 22b''' having a non-woven layer of felt substance made of one or more materials formed from non-continuous and/or continuous filaments. Dry insert 22''' may optionally include a water-swellable layer and/or one or more tapes for attaching the felt substance thereto. For instance, dry insert 22''' includes a plurality of water-swellable filaments 22a''' along with other filaments 22b''' that are non-swellable disposed between a plurality of optional tapes 22c''', thereby forming dry insert 22''', As used herein, "felt substance" means a material comprising one or more types of non-continuous or continuous filaments and/or fibers which have been caused to adhere and/or matt together through the action of heat, moisture, chemicals, pressure, or mechanical action such as needle-punching or spun-lacing, or a combination of the foregoing actions, thereby forming a relatively thick and compressible layer. Water-swellable filaments 22a''' may comprise any suitable water-swellable material. By way of example, dry insert 22''' of FIG. 3c may include about 25% or less by weight of water-swellable filaments 22a''' and about 75% or more by weight of other filaments 22b'''; however, other suitable ratios are possible. Other filaments 22b''' may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 22b''' and may be tailored for providing specific characteristics.

Figure 3D:
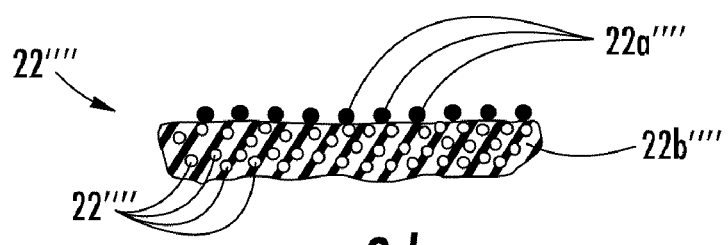

FIG. 3d depicts yet another dry insert 22'''' shaped as a generally flat tape having a compressible layer with a suitable width. By way of example, dry insert 22'''' is made of a plurality of filaments such as a plurality of generally continuous polyester filaments grouped together by a matrix material, but the use of other filament materials is possible. An optional compressible layer is formed by, for instance, foaming the matrix material, thereby providing a compressible layer 22b''''. In other embodiments, the matrix material is not foamed so it doesn't provide a compressible layer, but still provides the desired level of coupling using friction. Additionally the matrix material is used for attaching a plurality of water-swellable particles to dry insert 22'''' for forming a water-swellable layer 22a''''. Suitable foamed matrix materials include vinyls, polyurethanes, polypropylenes, EVAs, or polyethylene blends. The plurality of filaments and the matrix material are run through a die that forms dry insert 22'''' into its desired shape such as a generally flat ribbon-like profile. Dry inserts 22'''' may be run parallel to the fiber ribbons in a sandwich configuration or have other configurations such as helically wrapped about the optical fibers or ribbon stack. Other similar constructions are possible using any suitable materials for providing the compressible layer and the water-swellable layer. Dry insert can include still other constructions and/or materials such as sponge-like materials for a compressible layer such as polyvinylalcohol (PVA).

Although cavity 28a is depicted with a generally rectangular shape with a fixed orientation for housing the optical fiber ribbon, other shapes and arrangements are possible such as generally square, round, or oval. By way of example, cavity may be rotated or stranded in any suitable manner along its longitudinal length. The cavity can also have a partial oscillation through a given angle, for instance, the cavity can rotate between a clockwise angle that is less than a full rotation and then rotate counter-clockwise for less than a full rotation. Furthermore, one or more cavities may be offset towards one of the major surfaces, thereby allowing easy opening and access from one side. The cavity of a manufactured cable may have a slightly distorted (i.e., rounded or deformed) cross-section since it is difficult to maintain the sharp edges during manufacturing.

Figure 6A:
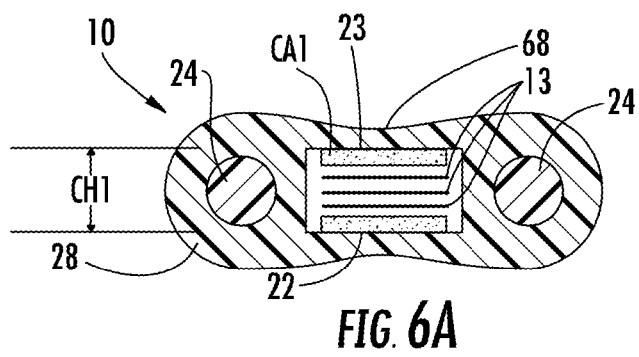
FIGS. 6A and 6B depict respective cross-sectional views at the sectional planes of FIG. 1 for a toneable fiber optic cable according to the present invention.
Figure 6B:
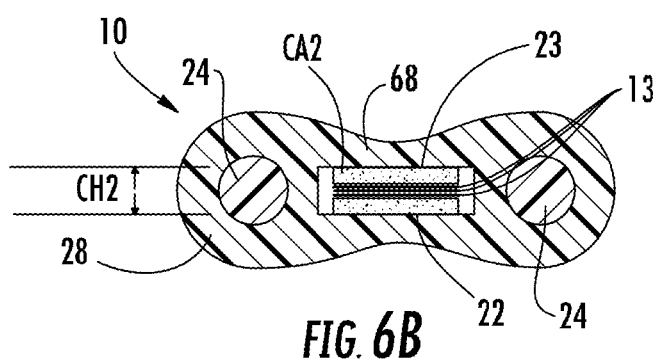

Cables according to the present invention may have any suitable dimensions, constructions, and/or fiber counts for the given application. By way of example, in distribution applications the width of the cable is preferably about 20 millimeters or less and the height of the cable is preferably about 12 millimeters or less. In drop applications, the width of the cable is preferably about 10 millimeters or less and the height of the cable is preferably about 5 millimeters or less. Of course, other cables of the present invention can have other sizes and/or structures for the given application depending on the requirements and fiber count of the cable. For instance, cables of the present invention may have larger dimensions for the major dimension, the minor dimension, and/or different structures such as a toneable portion as shown in FIGS. 6A and 6B for locating the cable in buried applications. Likewise, cable jackets and/or other cable components may be formed from a flame-retardant material and/or the cable can have a flame-retardant characteristic, thereby making it suitable for indoor applications such as multi-dwelling units (MDUs) or the like.

Besides being a dry cable design, the cable of FIGS. 2A and 2B is also advantageous because it can be easily accessed from either of the generally planar sides of the cable, thereby allowing access to the desired optical fiber. In other words, ribbons from either side of the ribbon stack, i.e., top or bottom, can be accessed by opening the cable at the respective planar side. Consequently, the craftsman or automation process has simple and easy access to the cavity 28a by running a utility blade or cutting tool along the length of the cable without cutting into strength members, thereby allowing entry to cavity while inhibiting damage to the optical fibers and/or strength members during the access procedure. In other words, the craftsman can simply cut into cable jacket by slicing the cable jacket and may use strength members as a guide for the blade or cutting tool, thereby exposing cavity during the cutting and allowing access to the at least one optical fiber therein. Thus, the optical fibers in the cables of the present invention may be easily, quickly, and repeatably accessed by a craftsman or likewise in an automated process. Additionally, the generally flat major surfaces of the cables are advantageous because they allow for a smaller cable footprint and uses less jacket material compared with round cables. Although the cable depicted in FIGS. 2A and 2B is a generally flat dry cable design having the fiber optic ribbon disposed between two dry inserts having a foam tape with a laminated water-swellable tape, the concepts of the invention are possible with other cable configurations.

Figure 4A:
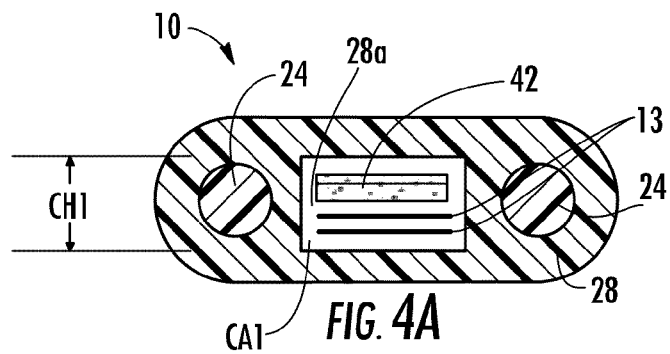
FIGS. 4A and 4B depict respective cross-sectional views at the sectional planes of FIG. 1 for another explanatory dry fiber optic cable according to the present invention.
Figure 4B:
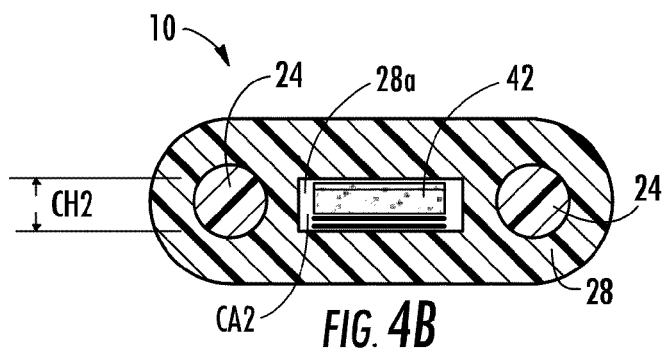
Figure 10:
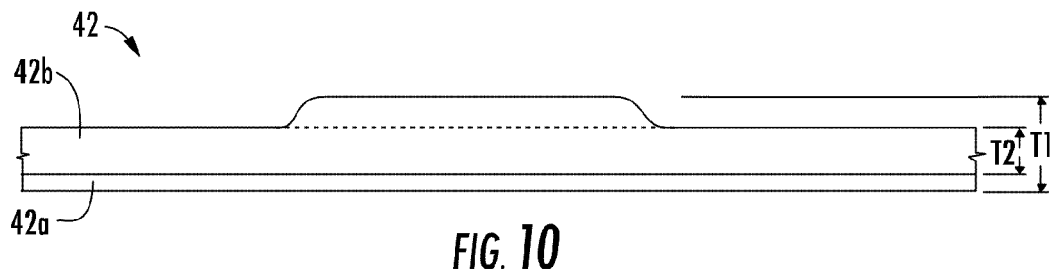
FIG. 10 is a side view of a generic dry insert having a change in thickness along a longitudinal direction according to the concepts of the present invention.

FIGS. 4A and 4B depict another cable 10 that is similar to the cable of FIGS. 2A and 2B, but only includes a single dry insert 42 within cavity 28a of cable jacket 28. As shown, in FIG. 4A, dry insert 42 and optical fiber ribbon 13 are, generally speaking loosely disposed within cavity 28a within the A-region, thus there is little to no coupling provided by this region (i.e., there is a vertical free space within the cavity). On the other hand, the B-region depicted by FIG. 4B provides the coupling since dry insert 42 is compressed within cavity 28a for providing a predetermined level of coupling. Dry insert can be compressed within the cavity to provide coupling using one or more methods. For instance, one method for compressing the dry insert 42 is by reducing the height of cavity 28a, thereby providing the desired degree of coupling. Dry insert 42 provides another method for providing coupling by using a thickness variation along the longitudinal length of dry insert 42. For instance, FIG. 10 is a side view of dry insert 42 showing a thickness that varies along its longitudinal length. Simply stated, dry insert 42 has a portion with a first thickness T1 and a portion with a second thickness T2 where the first thickness T1 is greater than the second thickness T2. The portion of dry insert 42 that has first thickness T1 forms a portion of the B-region of the cable since the dry insert thickness is compressed when disposed within the cavity 48a with the optical fiber ribbon 13. By way of example, dry insert 42 can have a dry insert thickness ratio defined as the second thickness T2 divided by the first thickness T1 with the dry insert thickness ratio (T2/T1) being between about 50% and 90%. By way of a numerical illustration, a nominal first thickness for the A-region of dry insert 42 is about 3.5 millimeters and a nominal second thickness for the B-region of dry insert 42 is about 4.5 millimeters, thereby yielding a dry insert thickness ratio of about 77%. Moreover, the thickened portion of dry insert 42 can have any suitable length and/or period along the length of same. Also, like dry insert 22, dry insert 42 can be formed from any suitable material, construction, or the like.

Figure 5A:
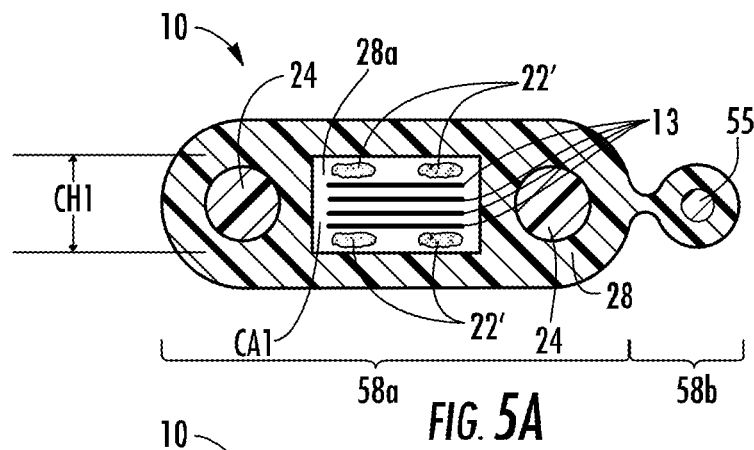
FIGS. 5A and 5B depict respective cross-sectional views at the sectional planes of FIG. 1 for still another explanatory dry fiber optic cable according to the present invention.
Figure 5B:
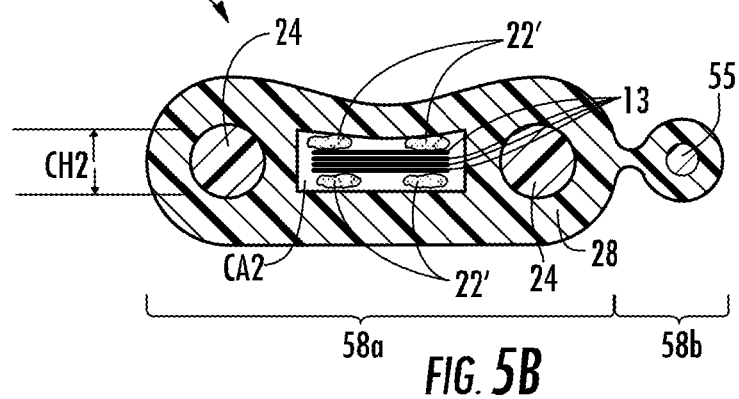

FIGS. 5A and 5B depict another cable that is similar to the cable of FIGS. 2A and 2B, but it depicts a plurality of dry inserts 22' disposed within a cavity 28a of cable jacket 28 along with a toneable lobe 58b that is useful for locating the cable in buried applications while still allowing for a dielectric main cable body 58a. As shown, the cable has four dry inserts 22' disposed within cavity 28a to cushion, couple and provide water-blocking. Specifically, dry inserts 22' are generally disposed to sandwich optical fiber ribbon therebetween, but the dry inserts 22' may migrate within cavity 28a to other positions. FIG. 5B shows a cross-sectional view of cavity 58a being constricted at the B-region. Additionally, other suitable inserts may be used with this cable or any other cable.

Toneable lobe 58b includes a conductive wire 55 disposed within toneable lobe 58b. By way of example, conductive wire 55 is a 24-gauge copper wire that allows the craftsman to apply a toning signal thereto for locating the cable so it can be located or have its location marked to prevent inadvertent damage. A cable jacket 58 and jacket portion of toneable lobe 58b are typically co-extruded simultaneously using the same extrusion tooling. As shown, toneable lobe 58b is connected with cable jacket 58 of the main cable body 58a by a frangible web (not numbered) so that toneable lobe 58b can easily be separated from main cable body 58a for connectorization or other purposes. Specifically, the web of toneable lobe 58b can include a preferential tear portion (not visible) using suitable geometry for controlling the location of the tear between the toneable lobe 58b and the main cable body 58a. Toneable lobe 58b preferably tears away from the main cable body cleanly so that it does not leave a ridge thereon, thereby allowing for a profile that permits easy sealing with a connector boot or the like. Using toneable lobe 58a is advantageous because if the cable is struck by lightning the toneable lobe 58a would be damaged, but the main cable body 58a would not be significantly damaged since it is dielectric. Consequently, the cable is toneable without requiring the labor and hardware necessary for grounding the cable. Of course, other cables of the present invention may also include a toneable lobe.

FIGS. 6A and 6B depict another cable 10 that is similar to the cable of FIGS. 2A and 2B, but it uses a slightly different jacket shape to improve side crush performance. Additionally, the dry inserts 22,23 of this embodiment do not include a water-swellable characteristic, but instead the cable includes a small quantity of water-swellable powder (not visible) disposed within a cavity 28a for inhibiting the migration of water therein. This cable provides improved side crush performance since cable jacket 28 has an upper concave wall (not numbered) and a lower concave wall (not numbered) for improving side-crush strength for the cable. Concave walls mean that the wall has an outer surface that is generally concave with a generally uniform wall thickness (i.e., the inner surface of the wall is curved to match the outer surface.) In other words, the concave walls increase the cables resistance to side-crush loads and helps preserves optical performance during the same. Other cables of the present invention may also use this concept.

Figure 7A:
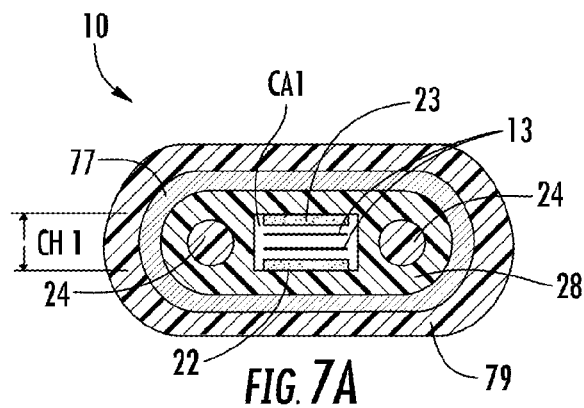
FIGS. 7A and 7B depict respective cross-sectional views at the sectional planes for a fiber optic cable having armor according to the present invention.
Figure 7B:
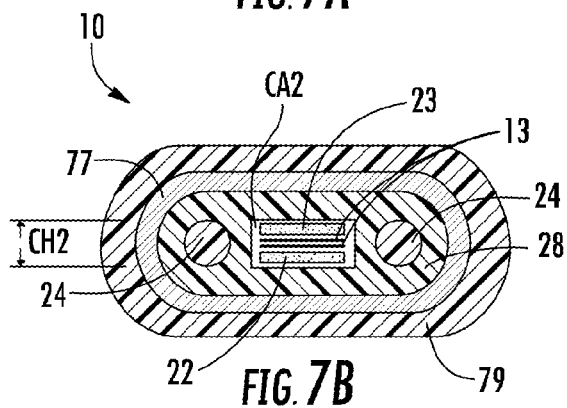

FIGS. 7A and 7B depict another cable 10 that is similar to the cable of FIGS. 2A and 2B, but it further includes an armor layer 77 disposed between a cable jacket 28 and a second jacket 79. Armor layer 77 provides rodent protection and/or additional crush strength for the cable. Specifically, the cable includes an optical fiber ribbon 13 disposed within a cavity 28a of cable jacket 28. Strength members 24 are attached to cable jacket 28 and disposed on opposite side of cavity 28a. Armor layer 77 is disposed about cable jacket 28 and is shown with a butting seam, but it may have an overlapping seam. Thereafter, second jacket 79 is applied over armor layer 77. Armor layer 77 may be formed from any suitable material such as a dielectric such as a high-strength polymer or a conductive material such as a steel tape. Moreover, the armor layer may be, shaped, ribbed, corrugated or the like for improving its crush strength and/or flexural performance of the cable. In other embodiments, the cable has two armor layers with one armor layer above the cavity and one armor layer below the cavity within a single cable jacket. Additionally, the two armor layers within the cable jacket may have respective curved end portions that generally contact each strength member 24 so that any crush forces are directed and/or transferred towards the same. Additionally, if a conductive armor component is used, strength members 24 are preferably also formed from a conductive material such as steel, rather than a more expensive glass-reinforced plastic strength member. Moreover, it is also possible to join or attach strength member 24 with the armor layer 77 by gluing, crimping, welding, or the like. Consequently, the properties of each cable jacket may be tailored for performance such as coupling, tear resistance, or the other properties. By way of example, cable jacket 28 may be a linear low-density polyethylene (LLDPE) for tear resistance and outer jacket 78 may be a medium or high density polyethylene for durability and abrasion resistance; however, other suitable materials may be used. In this embodiment, the cavity does not include a tube therein and the minor cavity dimension is smaller than the strength member dimension. Additionally, the cable may include one or more optional ripcords (not visible) for opening the cable and/or removing the armor layer.

Figure 8A:
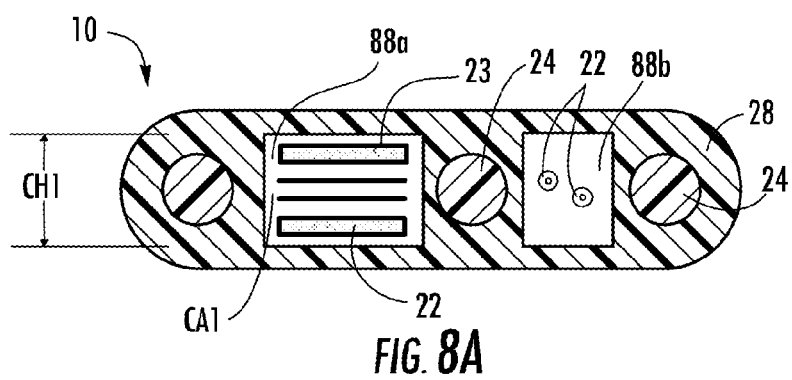
FIGS. 8A and 8B depict respective cross-sectional views at the sectional planes for a fiber optic cable having armor according to the present invention.
Figure 8B:
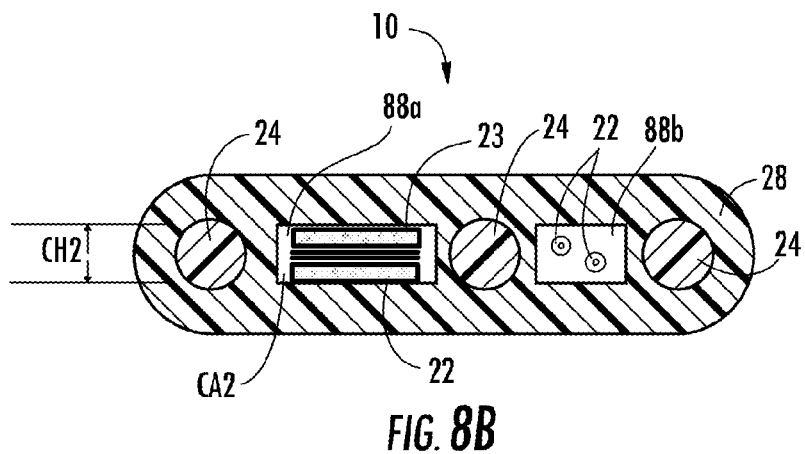

FIGS. 8A and 8B depict still another cable 10 that is similar to the cable of FIGS. 2A and 2B, but includes a plurality of cavities 88a,88b for housing communication elements such as optical fibers and/or copper wires. Using more than one cavity allows for flexibility in the cable applications. Multiple cavities can have similar or different sizes that are suited for the particular application. As shown, cavities 88a,88b have similar height dimensions, but have different widths dimensions, thereby allowing different ribbon fiber counts in respective cavities and/or other components. Specifically, cavity 88a is sized for a plurality of fiber optic ribbons 13 that can be accessed for distribution or the like along the cable and cavity 88b is sized for a plurality of copper conductors 82. Other embodiments are possible, for instance, the first cavity can have optical fiber ribbons with 4-fibers and the second cavity can have optical fiber ribbons with 12-fibers. FIGS. 8A and 8B also illustrates an optional strength member 24 disposed between cavities 88a and 88b. The optional strength member is advantageous if it desired to only access one of the cavities when opening the cable by allowing a stopping point and/or a guide for the cutting tool. The optional strength member may be the same size as the outboard strength members or it may have a different size. Moreover, the optional strength member may have a shape other than round so that the major cable dimension may be minimized. Other structures may be used for aiding in opening only one of multiple cavities. For instance, one or more cavities may be offset relative to the neutral axis that passes through the center points of strength members 24. By way of example, the cavity having the four fiber ribbons is easily accessible from one major surface and the cavity having the twelve fiber ribbons is easily accessible from the other major surface. Moreover, one or more of the major surfaces may be marked (not visible) to indicate which cavity is accessible from the given surface. Of course, other cables configurations of the present invention can also use more than one cavity.

Figure 9A:
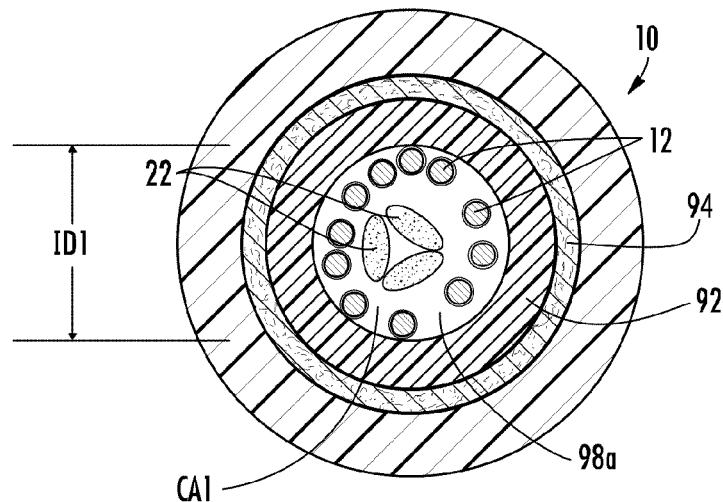
FIGS. 9A and 9B depict respective cross-sectional views at the sectional planes for a round fiber optic cable according to the present invention.
Figure 9B:
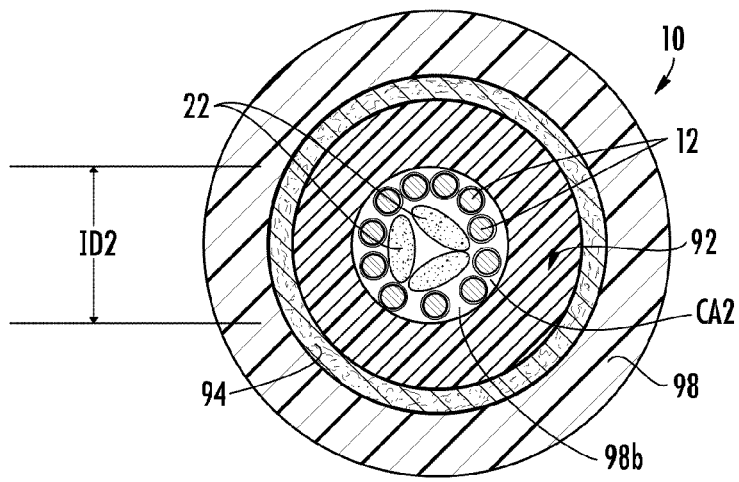

FIGS. 9A and 9B depict still another cable 10 configured as a round cable that includes loose optical fibers 12 and a plurality of dry inserts 22 disposed within a tube 92. In this cable tube 92 has an inner diameter that changes from the A-region to the B-region. Specifically, the A-region tube 92 has an inner diameter ID1 that is changes to an inner diameter ID2 in the B-region, thereby creating and/or increasing the coupling of optical fibers 12. In other words, a cavity 98a changes from a first cavity cross-sectional area CA1 to a second cavity cross-sectional area CA2, where the cavity cross-sectional ratio is between about 50% and 90%. Although shown as a plurality of dry inserts other embodiments can use a single dry insert that is generally disposed about the optical fibers. Additionally, this cable includes a plurality of strength members 92 that are configured as tensile yarns disposed about tube 92 and a cable jacket 98 therearound.

Besides ribbons and loose optical fibers, other packaging arrangements for the optical fibers are also possible such as having a plurality of optical fiber modules (not shown). Optical fiber modules organize and protect the plurality of optical fibers 12 within each module jacket that is extremely thin, flexible, and easily tearable without tools. Consequently, optical fiber modules can be routed out of the cavity of the cable while still having a protective covering disposed about the optical fibers. By way of example, the optical fiber module includes twelve colored optical fibers 12, thereby forming a relatively high optical fiber packing density. Moreover, optical fiber module allows access to individual optical fibers within the module jacket without having to remove the same from a ribbon matrix material. Preferably, module jackets are formed from a material that is easily tearable without tools. For instance, the module jacket is formed from a highly filled material so that it is easily tearable by the craftsman merely using his fingers to tear the same and it will not stick to colored or tight-buffered optical fibers during manufacturing. Suitable module jacket materials may include a polybutylene terephthalate (PBT), a polycarbonate and/or a polyethylene (PE) material and/or an ethylene vinyl acrylate (EVA) or other blends thereof having fillers like a chalk or talc; however, other suitable materials are possible such as a UV-curable acrylate. Modules may include other suitable cable components therein such as a grease, water-swellable yarn, suitable thread or tape, a ripcord, or other suitable component. Additionally, the cavity of cable may include grease, water-swellable yarn or tape, dry insert, and/or any other suitable component as desired.

Figure 11A:
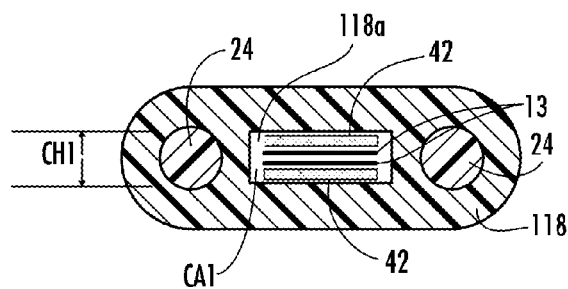
FIGS. 11A and 11B are respective cross-sectional views showing an explanatory fiber optic cable using the dry insert of FIG. 10 according to the present invention.
Figure 11B:
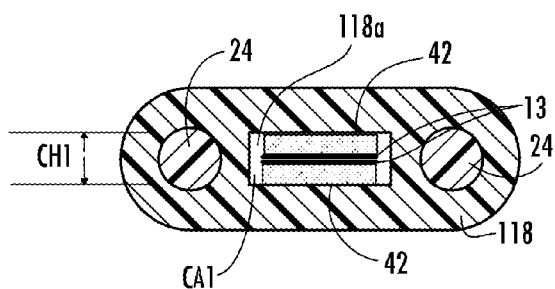

The concepts of the present invention may also be implemented using cable having cavities that do not change cross-sectional areas. FIG. 10 depicts a side view of a generic dry insert 42 that changes thickness along its longitudinal length of the same. Although dry insert 42 is depicted as having a compressible layer 42a and a water-swellable layer 42b that are laminated together such as a foam layer and a water-swellable layer the concept is applicable to other suitable dry inserts. Specifically, dry insert 42 has a first thickness T1 that is greater than a second thickness T2. For instance, a dry insert thickness ratio is defined as the second thickness T2 divided by the first thickness T1. The dry insert thickness ratio (T2/T1) is between about 50% and about 90%, but other values are possible. FIGS. 11A and 11B depict another fiber optic cable 10 where a cavity 118a has a similar cavity cross-sectional area CA1 (likewise the cavity height CH1 is the similar) in both the A-region and the B-region. Dry insert 42 can be formed with the first thickness T1 or an additional portion may be added to a dry insert having a uniform thickness (as represented by the portion above the dashed line), thereby forming the first thickness T1. In other words, an additional portion of a compressible layer may be positioned and/or attached to the dry insert having a generally uniform thickness at the desired position/spacing, thereby creating dry insert 42. As shown by FIG. 11A, optical fiber ribbons 13 are loosely disposed within a cavity 118a of a cable jacket 118 where dry insert(s) 42 has a second thickness T2. On the other hand, optical fiber ribbons 13 are coupled within cavity 118a of cable jacket 118 where dry insert(s) 42 have a first thickness T1. The concepts of this cable design may be applied to other cable designs with or without changing the cavity cross-sectional area.

Figure 12:
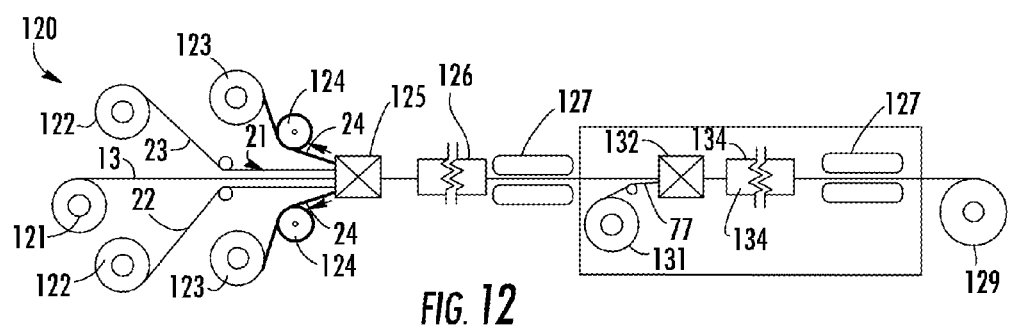
FIG. 12 schematically depicts an explanatory manufacturing line for making fiber optic cables according to the present invention.

FIG. 12 schematically illustrates an explanatory one-pass manufacturing line 120 for tubeless fiber optic cables according to the present invention such as shown in FIGS. 2A and 2B; however, other variations of the concepts may be used to manufacture other assemblies and/or cables according to the concepts of the present invention. One pass manufacturing line 120 includes at least one optical ribbon payoff reel 121, a plurality of dry insert payoff reels 122, a plurality of strength member payoff reels 123, a plurality of strength member capstans 124, a cross-head extruder 125, a water trough 126, one or more caterpullers 127, and a take-up reel 129. Additionally, tubeless fiber optic cables may further include an armor layer and a second cable jacket therearound, thereby forming a tubeless fiber optic cable similar the cable illustrated in FIGS. 7A and 7B. The armor layer and/or second cable jacket can be manufactured on the same line or on a second manufacturing line.

The explanatory manufacturing process includes paying-off at least one optical fiber ribbon 13 and dry inserts 22,23 from respective reels 131, 132, and 132 and the different methods for forming the coupling features are discussed below. Only one payoff reel for optical fiber ribbon 13 is shown for clarity. However, manufacturing lines can include any suitable number of payoff reels for one or more ribbons or optical fibers in order to manufacture assemblies and/or cables according to the present invention. Thereafter, dry inserts 22,23 are generally positioned about optical fiber ribbon 13, thereby forming a cable core 21 (i.e., a dry insert-ribbon composite stack or sandwich). Additionally, strength members 24 are paying-off respective reels 123 under a relatively high tension (e.g., between about 100 to about 600 pounds) using respective strength member capstans 124, thereby elastically stretching strength members 24 (represented by the arrows) so that ERL is produced in the tubeless fiber optic cable. In other words, after the tension is released on strength members 24 they return to their original unstressed length (i.e. shorten), thereby producing ERL such as up to 1.2% or more since the ribbons were introduced into the cable with about the same length as tensioned strength members and the ribbons were not stretched. Stated another way, the amount of ERL produced is equal to about the strength member strain (i.e., elastically stretching of the strength member) plus any plastic shrinkage of the cable jacket that may occur. The strength member strain can create a significant amount of ERL or EFL in a one-pass production such as 10% or more, 25% or more, 50% or more, and even up to 80% or more of the total ERL or EFL within the cable. Furthermore, elastically stretching of the strength member is advantageous since it allows for a precise control of the amount of ERL or EFL being introduced into the cable and greatly reduces strength member pistoning since the finished cable jacket is in compression instead of tension. For the manufacture of the tubeless fiber optic cable 10 of FIGS. 2A and 2B, about 95% of ERL is introduced into the cable by elastically stretching the strength members. Thereafter, cable core 21 and strength members 24 are fed into cross-head extruder 125 where cable jacket 28 is extruded about cable core 21 and strength members 24, thereby forming the tubeless fiber optic cable 10. As shown by FIG. 12, cable jacket is being applied about the optical fibers and strength members by cross-head extruder 125 while the strength members are elastically stretched. After extrusion, cable 10 is then quenched in water trough 126 while the strength member is still elastically stretched, thereby allowing the cable jacket to "freeze" on the stretched strength members. Tubeless fiber optic cable 10 is pulled through the manufacturing line using one or more caterpullers 127 and then wound onto take-up reel 129 under low tension (i.e., the tensile force that elastically stretched the strength members is released and strength members return to a relaxed length thereby creating ERL or EFL in the cable). As depicted in the box, one manufacturing line may be used to form a tubeless fiber optic cable similar to tubeless fiber optic cable 10 as shown in FIGS. 7A and 7B. As shown, a second caterpuller 127 is used for pulling the cable assembly as the armor layer 77 is paid-off a reel 131 and formed about cable 10 using suitable armor forming equipment (not depicted), and a second cable jacket 79 is extruded thereover using a cross-head extruder 132. Thereafter, the tubeless fiber optic cable armored cable passes into a second water trough 134 before being wound-up on take-up reel 129. Additionally, other cables and/or manufacturing lines according to the concepts of the present invention are possible. For instance, cables and/or manufacturing lines may include a water-swellable tape, yarn, or the like; however, the use of one or more other suitable cable components is possible.

Figures 13A, 13B:
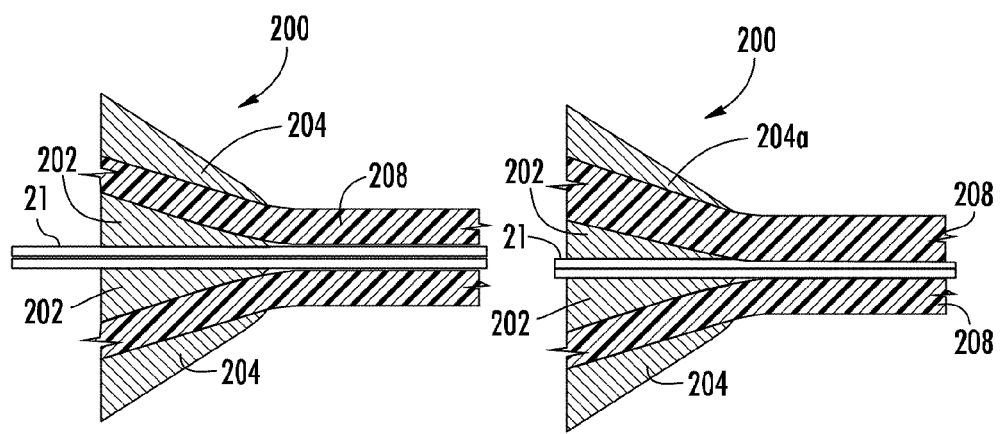
FIGS. 13A and 13B schematically depicts concepts for changing a cross-sectional area of the cavity according to the present invention.
Figures 14A, 14B:
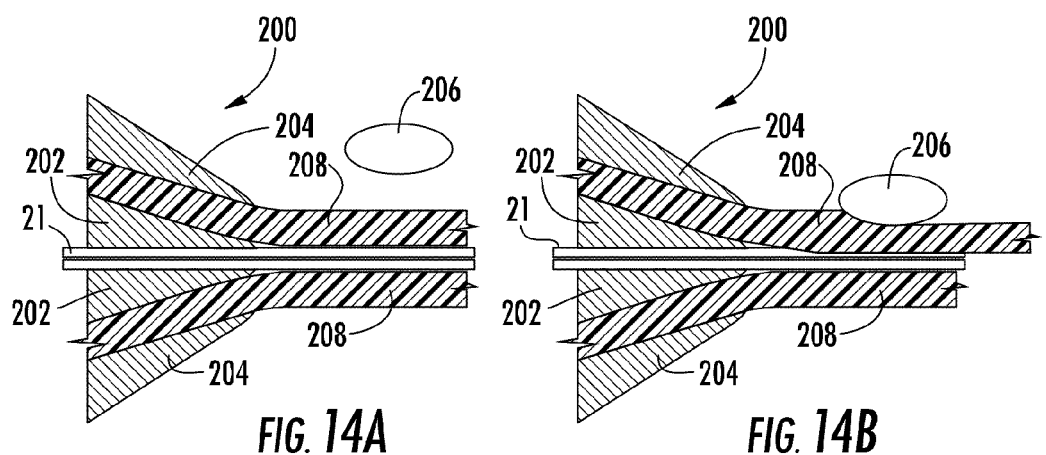
FIGS. 14A and 14B schematically depict another method for changing a cross-sectional area of the cavity according to the present invention.

If the coupling feature is formed merely by using dry insert 42 with a changing thickness then the explanatory manufacturing line shown in FIG. 12 is suitable for making the fiber optic cable of FIGS. 11A and 11B. However, if the coupling feature is provided by changing the cavity cross-sectional area then additional manufacturing complexity is required for the explanatory manufacturing line of FIG. 12 as discussed below. FIGS. 13A and 13B schematically depict one method using an exemplary extrusion tooling 200 for changing the cavity cross-sectional area by changing the amount of polymer provided during extrusion of the B-region of the cable. Specifically, extrusion tooling 200 includes a tip 202 and a die 204 that can allow more polymer into the cable cross-section, thereby resulting in a smaller cavity cross-section. More specifically, during manufacturing one or more portions of die 204 can move from a first position shown in FIG. 13A to a second position shown in FIG. 13B, thereby allowing more of a molten polymer 208 to pass into the cable cross-section. Additionally, the extruder screw speed may have to increase to deliver more molten polymer for the cable jacket. As shown in FIG. 13B, an upper portion 204a of die 204 moves upward to allow more molten polymer to flow and creating a thicker jacket wall thickness (i.e., a smaller cavity) in the B-region of the cable. Since only the upper portion 204a of die 204 moves the cavity formed is asymmetrical, if both an upper and lower portion of die 204 moves then the cavity more symmetrical. FIGS. 14A and 14B depict another method for changing the cross-sectional shape of the cavity. As shown, FIG. 14A shows the extrusion tooling 200 and a deforming element 206 for making cable in the A-region. When the B-region of the cable is desired, deforming element 206 contacts the molten cable jacket 208 to deform the same, thereby changing the cavity cross-sectional area. Other manufacturing methods are also possible. By way of example, another method may use both a moveable die to increase amount of molten material and then use one or more deforming elements to create a change in cross-sectional shape. Further these methods can be applied to tubes and/or round cable in order to create the desired level of coupling.

Figure 15:
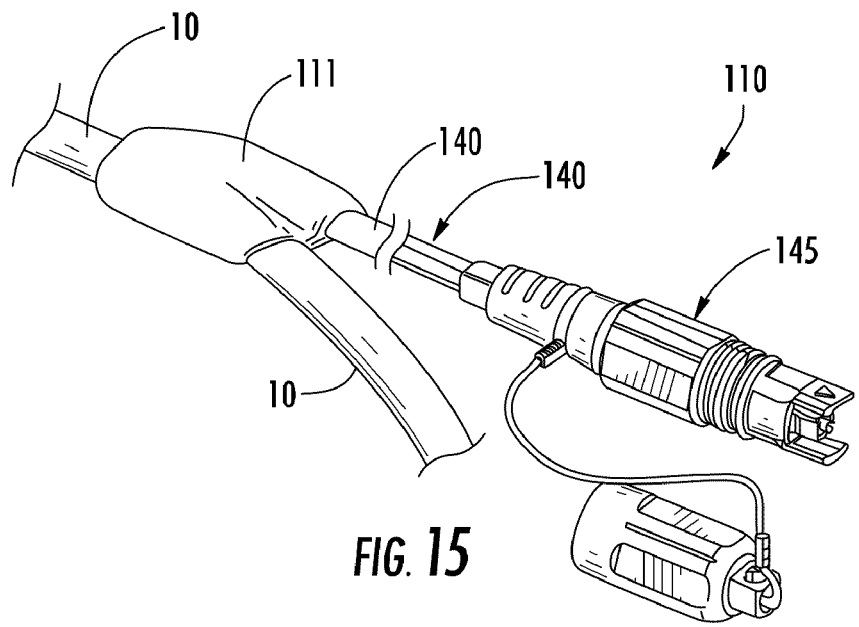
FIG. 15 depicts a perspective view of a fiber optic cable assembly that includes a fiber optic cable along with a tether cable that is preconnectorized with a hardened connector according to the present invention.
Figure 16:
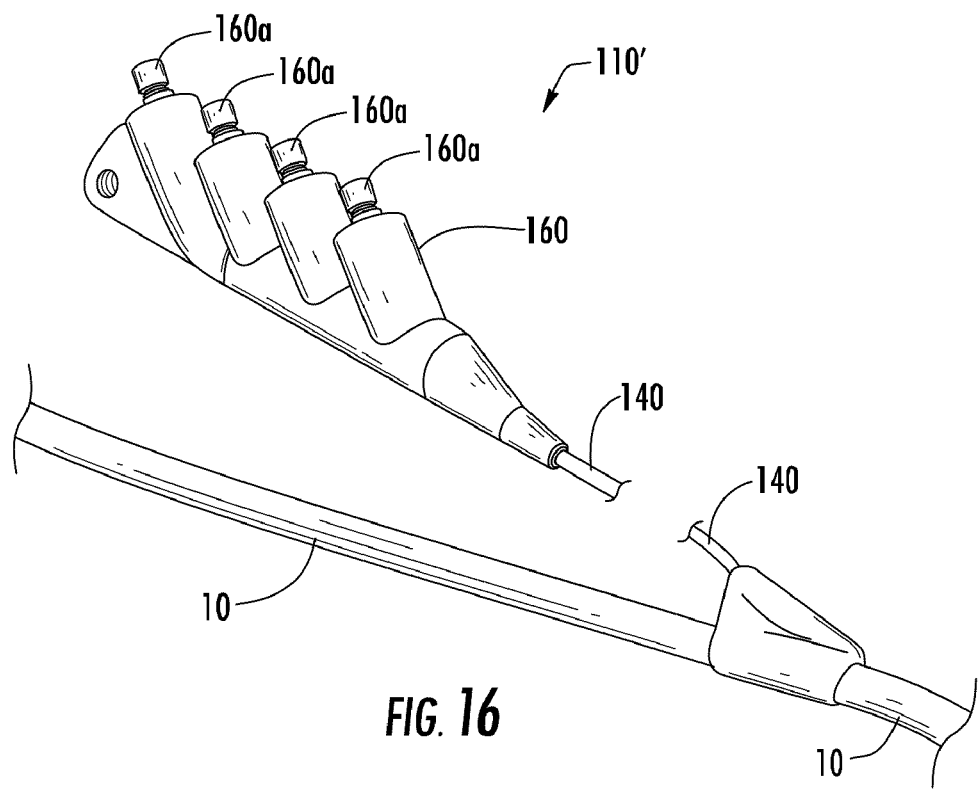
FIG. 16 depicts another perspective view of a fiber optic cable assembly that includes a fiber optic cable along with a tether cable having a multiport according to the present invention.

Cables of the present invention are also useful as a portion of a larger cable assembly that is useful for distributing optical fibers toward the subscriber. The cable assemblies can be assembled in the factory or they can be constructed in the field. A variety of fiber optic assemblies may be constructed from fiber optic cables of the present invention. For instance, FIG. 15 depicts fiber optic cable assembly 110 that includes fiber optic cable 10 as a portion of a distribution cable assembly. As shown, a tether cable 140 is attached to fiber optic cable 10 at a first end and includes a protective covering 111 for covering the splice portion between fiber optic cable 10 and tether cable 140. A second end of tether cable 140 can include one or more ferrules attached thereto and the ferrule may be a portion of a receptacle, plug, or the like for plug and play connectivity. Illustratively, FIG. 15 depicts a hardened plug connector 145 on the second end of tether cable 140. Of course, the second end of tether cable 140 can have any suitable configuration for connectivity such as splice-ready optical fibers, a connector or a receptacle having a ferrule, a multi-port or the like, thereby allowing the craft flexibility for downstream connectivity. FIG. 16 depicts a fiber optic cable assembly 110' similar to FIG. 15 but it includes a multi-port 160 having a plurality of receptacles 160a attached to a second end of tether cable 140. Likewise, other types and/or structures are possible for fiber optic assemblies according to the concepts of the invention. For instance, a hardened connector or receptacle could be directly attached to the tubeless fiber optic cable.

It will be apparent to those skilled in the art that various modifications and variations can be made in the cable and cable assemblies of the present invention without departing from the spirit or scope of the invention. For instance, cables or assemblies of the present invention can include other cable components such as ripcords, paper or mica tapes, a friction element, and/or other suitable components. Thus, it is intended that the present invention cover the modifications and variations of this invention provided they come within the scope of the appended claims and their equivalents.

We claim:

1. A fiber optic cable comprising:
at least one optical fiber;
a polymer cable jacket extruded about the at least one optical fiber, the cable jacket having at least one cavity, wherein
the at least one optical fiber is disposed within the at least one cavity,
the at least one cavity has a plurality of first regions having a first cavity cross-sectional area (CA1) and a plurality of second regions having a second cavity cross-sectional area (CA2) located at different longitudinal locations along the cable, and
the first cavity cross-sectional area is greater than the second cavity cross-sectional area; and
one or more dry inserts disposed in the at least one cavity.

2. The fiber optic cable of claim 1, the cavity having a cavity cross-sectional ratio defined as the second cavity cross-sectional area divided by the first cavity cross-sectional area, wherein the cavity cross-sectional ratio (CA2/CA1) is between 50% and 90%.

3. The fiber optic cable of claim 2, the at least one optical fiber having a predetermined level of coupling to the cable jacket wherein the predetermined level of coupling is about 0.1625 Newtons or more per optical fiber for a thirty meter length of fiber optic cable.

4. The fiber optic cable of claim 3, further comprising one or more water-blocking elements disposed in the at least one cavity and comprising one or more of a water-blocking powder, a water-blocking yarn, a water-blocking thread, a water-blocking tape, and a water-blocking gel.

5. The fiber optic cable of claim 1, the at least one optical fiber having a predetermined level of coupling to the cable jacket wherein the predetermined level of coupling is about 0.1625 Newtons or more per optical fiber for a thirty meter length of fiber optic cable.

6. The fiber optic cable of claim 1, further comprising one or more water-blocking elements disposed in the at least one cavity and comprising one or more of a water-blocking powder, a water-blocking yarn, a water-blocking thread, a water-blocking tape, and a water-blocking gel.

7. The fiber optic cable of claim 1, further comprising a first strength element on a first side of the at least one cavity and a second strength element on a second side of the at least one cavity.

8. The fiber optic cable of claim 7, wherein at least one of the first regions has a length of at least 300 centimeters.

9. The fiber optic cable of claim 8, wherein the at least one cavity is generally rectangular.

10. The fiber optic cable of claim 1, wherein at least one of the first regions has a length of at least 300 centimeters.

11. A fiber optic cable comprising:
at least one optical fiber;
at least one dry insert; and
a polymer cable jacket extruded about the at least one optical fiber, the cable jacket having at least one cavity, wherein
the at least one optical fiber and the at least one dry insert are disposed within the at least one cavity,
the cavity has a plurality of first regions having a first cavity cross-sectional area (CA1) and a plurality of second regions having a second cavity cross-sectional area (CA2) located at different longitudinal locations along the cable, and
the first cavity cross-sectional area is greater than the second cavity cross-sectional area.

12. The fiber optic cable of claim 11, the cavity having a cavity cross-sectional ratio defined as the second cavity cross-sectional area divided by the first cavity cross-sectional area, wherein the cavity cross-sectional ratio (CA2/CA1) is less than 90%.

13. The fiber optic cable of claim 12, wherein the cavity cross-sectional ratio (CA2/CA1) is between 50% and 90%.

14. The fiber optic cable of claim 12, the at least one optical fiber having a predetermined level of coupling to the cable jacket wherein the predetermined level of coupling is about 0.1625 Newtons or more per optical fiber for a thirty meter length of fiber optic cable.

15. The fiber optic cable of claim 12, further comprising one or more water-blocking elements disposed in the at least one cavity.

16. The fiber optic cable of claim 12, the at least one dry insert having a compressible layer and a water-swellable layer that are attached together.

17. The fiber optic cable of claim 12, further comprising a first strength element on a first side of the at least one cavity and a second strength element on a second side of the at least one cavity.

18. The fiber optic cable of claim 17, wherein the at least one cavity is generally rectangular.

19. The fiber optic cable of claim 18, wherein at least one of the first regions has a length of at least 300 centimeters.

20. The fiber optic cable of claim 12, wherein at least one of the first regions has a length of at least 300 centimeters.

21. The fiber optic cable of claim 20, wherein the at least one dry insert extends through the plurality of second regions.

22. A method for manufacturing a fiber optic cable comprising at least one optical fiber disposed in at least one cavity of a cable jacket, comprising:
 providing at least one optical fiber; and
 extruding a cable jacket about the at least one optical fiber, the cable jacket having a cavity, wherein
  extruding the cable jacket includes changing a cavity cross-sectional area between at least one first location and at least one second location along a length of the cable jacket for improving coupling of the at least one optical fiber, and wherein the cable jacket has one or more dry inserts disposed in the at least one cavity.

23. The method of claim 22, wherein the at least one first location comprises a plurality of first locations of first cavity cross-sectional area (CA1) and the at least one second location comprises a plurality of second locations of second cavity cross-sectional area (CA2).

24. The method of claim 23, wherein the cavity cross-sectional ratio (CA2/CA1) is less than 90%.

25. The method of claim 24, wherein the cavity cross-sectional ratio (CA2/CA1) is between 50% and 90%.

26. The method of claim 23, wherein changing of the cavity cross-sectional area comprises extruding a cable jacket having a wall thickness that varies the cavity cross-sectional area at one or more locations along the cable jacket or deforming the cable jacket while is it still molten.

27. The method of claim 23, wherein the at least one optical fiber has a predetermined level of coupling to the cable jacket wherein the predetermined level of coupling is about 0.1625 Newtons or more per optical fiber for a thirty meter length of fiber optic cable.

28. The method of claim 23, further comprising providing one or more water-blocking elements for inhibiting the migration of water along the fiber optic cable.

29. The method of claim 23, further comprising applying a first strength element on a first side of the at least one cavity and a second strength element on a second side of the at least one cavity.

30. The method of claim 23, wherein an amount of polymer provided during extrusion of the cable jacket is varied during extrusion to form the differing first and second cross-sectional areas.

31. The method of claim 23, wherein during extrusion of the cable jacket a deforming element contacts the cable jacket to change the cavity cross-sectional area.

32. The method of claim 22, wherein an amount of polymer provided during extrusion of the cable jacket is varied during extrusion to form the differing first and second cross-sectional areas.

33. The method of claim 22, wherein during extrusion of the cable jacket a deforming element contacts the cable jacket to change the cavity cross-sectional area.

* * * * *